United States Patent
Shimada (10) Patent No.: US 12,521,282 B2
(45) Date of Patent: Jan. 13, 2026

(54) ABSORBENT BODY PRODUCTION DEVICE AND ABSORBENT BODY PRODUCTION METHOD

(71) Applicant: ZUIKO CORPORATION, Ibaraki (JP)

(72) Inventor: Takahiro Shimada, Ibaraki (JP)

(73) Assignee: ZUIKO CORPORATION, Ibaraki (JP)

( * ) Notice: Subject to any disclaimer, the term of this patent is extended or adjusted under 35 U.S.C. 154(b) by 482 days.

(21) Appl. No.: 18/013,680

(22) PCT Filed: Jul. 5, 2021

(86) PCT No.: PCT/JP2021/025249
§ 371 (c)(1),
(2) Date: Dec. 29, 2022

(87) PCT Pub. No.: WO2022/019094
PCT Pub. Date: Jan. 27, 2022

(65) Prior Publication Data
US 2023/0338198 A1  Oct. 26, 2023

(30) Foreign Application Priority Data
Jul. 20, 2020  (JP) ................................ 2020-123745

(51) Int. Cl.
*A61F 13/15* (2006.01)
(52) U.S. Cl.
CPC .. *A61F 13/15658* (2013.01); *A61F 13/15772* (2013.01)
(58) Field of Classification Search
None
See application file for complete search history.

(56) References Cited

U.S. PATENT DOCUMENTS

2020/0170845 A1   6/2020   Nakamura et al.
2020/0352793 A1*  11/2020  Satou ................... A61F 13/1565

FOREIGN PATENT DOCUMENTS

| CN | 110559133 A | 12/2019 |
| JP | 2015-19908 A | 2/2015 |
| JP | 2015-19909 A | 2/2015 |
| WO | 2019/026971 A1 | 2/2019 |
| WO | 2019/097988 A1 | 5/2019 |

OTHER PUBLICATIONS

PCT/ISA/210, "International Search Report for PCT International Application No. PCT/JP2021/025249," Aug. 17, 2021.

* cited by examiner

*Primary Examiner* — Barbara J Musser
(74) *Attorney, Agent, or Firm* — HAUPTMAN HAM, LLP (57) ABSTRACT

An absorbent body production device and an absorbent body production method can suppress scattering of an absorbing substance during spraying of the absorbing substance to a substrate. A substrate is conveyed along a rotating outer circumferential surface of a conveyance drum. A granular absorbing substance is discharged from a spray port of a spray apparatus facing the outer circumferential surface of the conveyance drum, and the absorbing substance is sprayed to the substrate which is conveyed along the outer circumferential surface of the conveyance drum. The spray position at which the absorbing substance is sprayed to the substrate is controlled. For example, the position of the spray port of the spray apparatus, or the angle at which the absorbing substance is discharged from the spray port of the spray apparatus is controlled.

7 Claims, 5 Drawing Sheets

ABSORBENT BODY PRODUCTION DEVICE AND ABSORBENT BODY PRODUCTION METHOD

RELATED APPLICATIONS

The present application is National Phase of International Application No. PCT/JP2021/025249 filed Jul. 5, 2021, and claim priority from Japanese Application No. 2020-123745, filed Jul. 20, 2020, the disclosures of which are hereby incorporated by reference herein in its entirety.

TECHNICAL FIELD

The present invention relates to an absorbent body production device and an absorbent body production method, and more specifically, relates to a technology of producing an absorbent body by spraying an absorbing substance to a substrate.

BACKGROUND ART

An absorbent body containing an absorbing substance capable of absorbing and holding liquid is used for absorbent articles such as disposable diapers, disposable shorts, sanitary napkins and incontinence pads.

Figure 6:
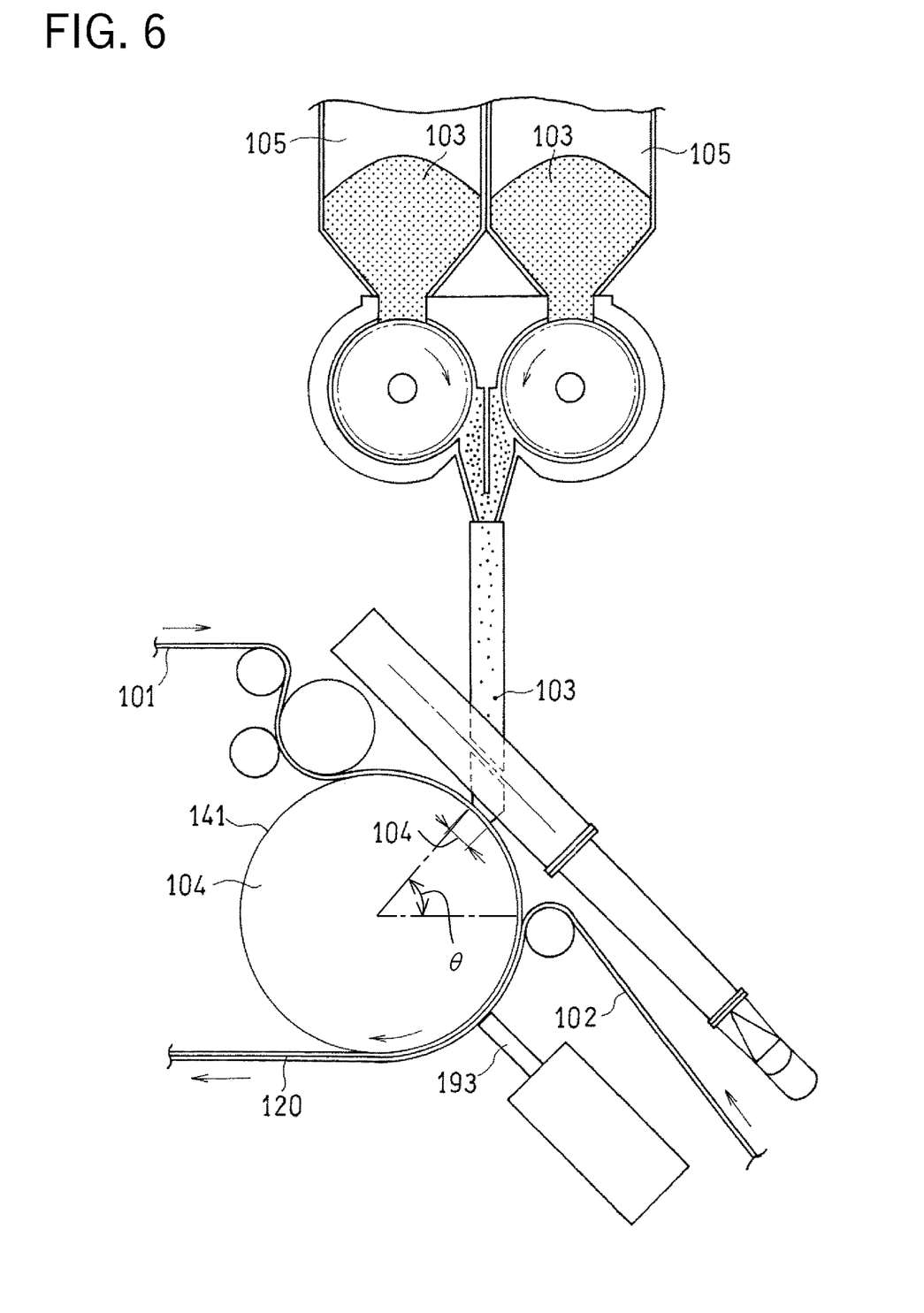
FIG. 6 is a schematic configuration view of the absorbent body production device (first conventional example).

The absorbent body is produced, for example, by using an absorbent body production device shown in a schematic configuration view of FIG. 6. As shown in FIG. 6, a substrate 101 is conveyed along an outer circumferential surface 141 of a rotating conveyance drum 104. The conveyance drum 104 sucks air from the outside toward the inside through the outer circumferential surface 141. A granular absorbing substance 103 is stored in a tank 105 of a spray apparatus, and is dropped little by little toward the conveyance drum 104. The absorbing substance 8 is sprayed to the substrate 101 when the substrate 101 passes an area 104 where the absorbing substance 8 drops. A coating sheet 102 is overlaid on the substrate 101 to which the absorbing substance 8 has been sprayed, and the coating sheet 102 and the substrate 101 are ultrasonically joined together by an ultrasonic horn 193, thereby forming an absorbent body 120 (for example, see Patent Literature 1).

CITATION LIST

Patent Literature

[Patent Literature 1] JP 2015-19908 A

SUMMARY OF THE INVENTION

Problem to be Solved by the Invention

In a case where the absorbent body is produced by spraying the absorbing substance to the substrate being conveyed by the conveyance drum as described above, the suction pressure is adjusted in a manner that the absorbing substance having reached the substrate is trapped.

However, when the reaching position (spray position) of the absorbing substance is inappropriate, there are cases where the absorbing substance is bounced off the substrate and this makes it impossible to suppress scattering of the absorbing substance even if the suction pressure is adjusted.

Moreover, for example, when the rotation speed of the conveyance drum is increased, there are cases where the absorbing substance is bounced off the substrate by a shift of the reaching position (spray position) of the absorbing substance caused by an air flow occurring in the rotation direction of the drum and this makes it impossible to suppress scattering of the absorbing substance even if the suction pressure is adjusted.

In view of such circumstances, a problem to be solved by the present invention is to provide an absorbent body production device and an absorbent body production method that make it possible to suppress scattering of the absorbing substance during spraying of the absorbing substance to the substrate.

Means for Solving the Problem

To solve the above-mentioned problem, the present invention provides an absorbent body production device structured as follows:

The absorbent body production device is provided with (a) a conveyance drum having a rotating cylindrical outer circumferential surface and conveying a substrate along the outer circumferential surface, (b) a spray apparatus having a spray port facing the outer circumferential surface of the conveyance drum, discharging a granular absorbing substance from the spray port and spraying the absorbing substance to the substrate being conveyed along the outer circumferential surface of the conveyance drum, and (c) spray position control means for controlling a spray position at which the absorbing substance is sprayed to the substrate.

According to the above-described structure, the discharge position at which the absorbing substance is sprayed to the substrate can be controlled in a manner that scattering of the absorbing substance is suppressed during spraying of the absorbing substance to the substrate.

In the above-described structure, the absorbing substance may be sprayed to an area where the outer circumferential surface of the conveyance drum moves downward or the absorbing substance may be sprayed to an area where the outer circumferential surface of the conveyance drum moves upward.

Preferably, the spray position control means controls the spray position in a manner that, when an angle formed by a horizontal plane and a straight line vertical to a rotation center line of the conveyance drum and passing the spray position is θ, the angle θ is within a predetermined range satisfying $0° \leq θ \leq 60°$.

In this case, it is easy to trap the sprayed absorbing substance in the substrate.

The above-mentioned angle θ includes not only the angle θ shown in a first and second embodiments described later but also the angle θ' shown in a first modification described later.

More preferably, the spray position control means controls the spray position in a manner that $θ=45°$ is included within the predetermined range of the angle θ.

In this case, it is easier to trap the sprayed absorbing substance in the substrate.

Preferably, the spray position control means controls a position of the spray port of the spray apparatus or a discharge angle at which the absorbing substance is discharged from the spray port of the spray apparatus.

In this case, it is easy to control the spray position of the absorbing substance.

Moreover, to solve the above-mentioned problem, the present invention provides an absorbent body production method structured as follows:

The absorbent body production method is provided with (i) a conveyance step of conveying a substrate along a rotating outer circumferential surface of a conveyance drum and (ii) a spray step of discharging a granular absorbing substance from a spray port facing the outer circumferential surface of the conveyance drum and spraying the absorbing substance to the substrate being conveyed along the outer circumferential surface of the conveyance drum. At the spray step, a spray position at which the absorbing substance is sprayed to the substance is controlled.

According to the above-described method, the spray position at which the absorbing substance is sprayed to the substrate can be controlled in a manner that scattering of the absorbing substance is suppressed during spraying of the absorbing substance to the substrate.

In a preferred mode, the outer circumferential surface of the conveyance drum is air-permeable. The substrate includes (a) an air-permeable support sheet conveyed along the outer circumferential surface of the conveyance drum and (b) a pulp layer where pulp crushed and conveyed by a duct is sucked and fiber-laminated in a predetermined pattern on the support sheet. At the spray step, the absorbing substance is sprayed to the pulp layer.

In another preferred mode, the substrate includes a nonwoven fiber sheet conveyed along the outer circumferential surface of the conveyance drum. At the spray step, the absorbing substance is sprayed to one main surface of the nonwoven fabric sheet. At the conveyance step, the nonwoven fabric sheet includes a bulky structure constituting at least part of the one main surface and having a gap for the absorbing substance to enter.

Effects of the Invention

According to the present invention, scattering of the absorbing substance can be suppressed during spraying of the absorbing substance to the substrate.

MODE FOR CARRYING OUT THE INVENTION

Hereinafter, embodiments of the present invention will be described with reference to the drawings.

<First embodiment> An absorbent body production device 10 and an absorbent body production method according to the first embodiment will be described with reference to FIGS. 1 to 3.

Figure 1:
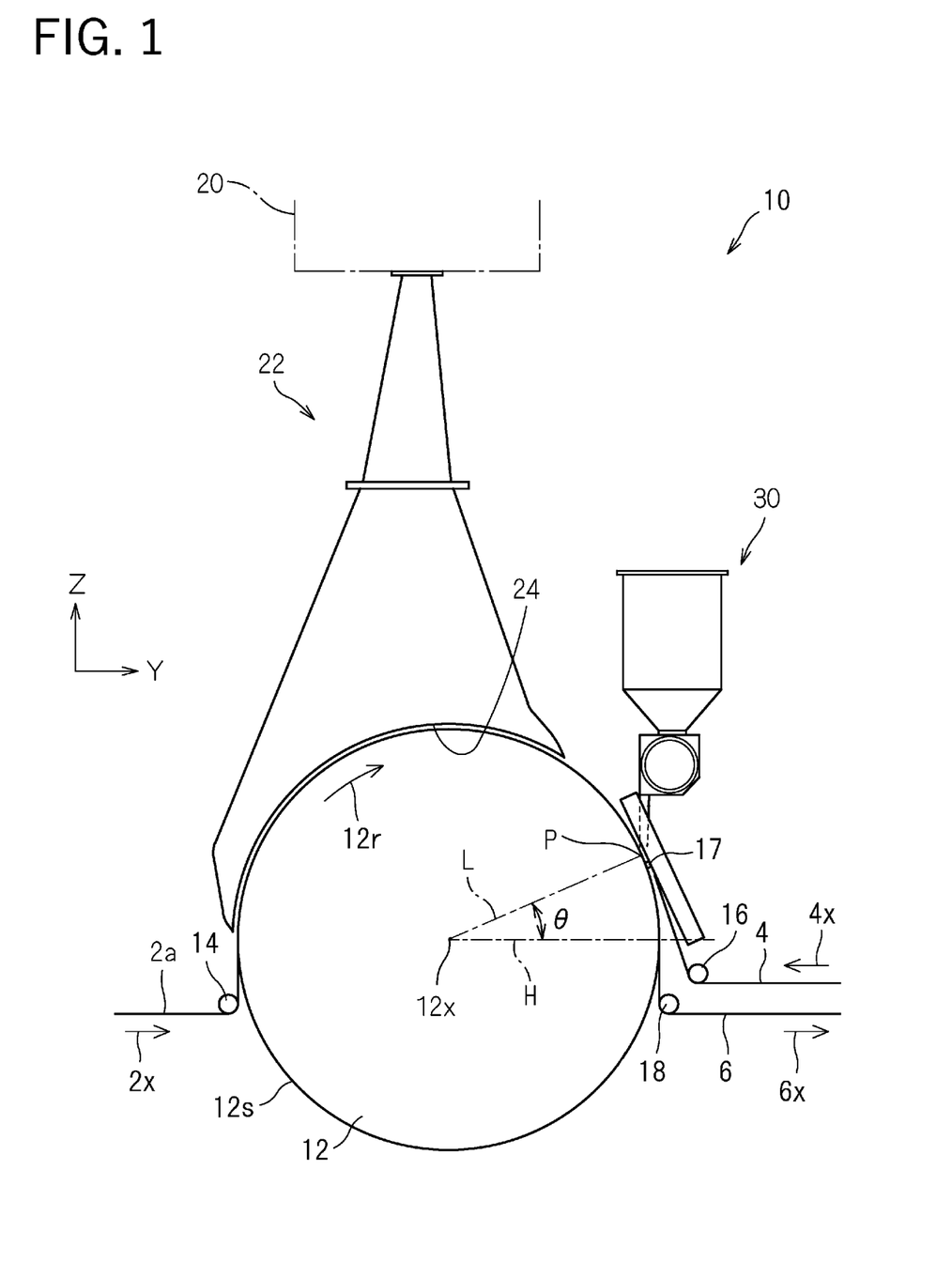
FIG. 1 is a schematic view of an absorbent body production device (first embodiment).
Figure 2:
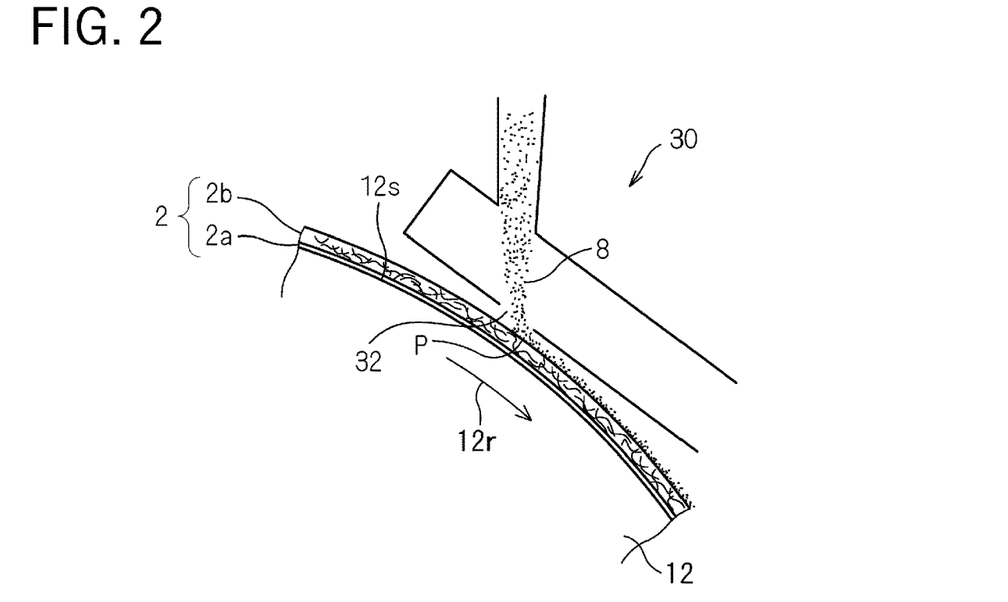
FIG. 2 is a relevant part schematic view of the absorbent body production device (first embodiment).

FIG. 1 is a schematic view showing the structure of the absorbent body production device 10. FIG. 2 is a relevant part schematic view of the absorbent body production device 10. As shown in FIGS. 1 and 2, in the absorbent body production device 10, a duct 22 for forming a pulp layer 2b and a spray apparatus 30 that sprays a granular absorbing substance 8 to the formed pulp layer 2b are disposed around a conveyance drum 12. The conveyance drum 12 conveys in the direction indicated by the arrow 12r, a first and second sheets 2a and 4 are conveyed in the directions indicated by the arrows 2x and 4x, and an absorbent body 6 is conveyed in the direction indicated by the arrow 6x.

The conveyance drum 12 has a cylindrical outer circumferential surface 12s, and is disposed in a manner that the rotation center line 12x extends horizontally. The outer circumferential surface 12s of the conveyance drum 12 is air-permeable; for example, a large number of suction holes (not shown) are formed in a predetermined area of the outer circumferential surface 12s. A non-illustrated suction box is disposed inside the conveyance drum 12, and air is sucked from the outside toward the inside through the outer circumferential surface 12s of the conveyance drum 12 in a predetermined range (for example, a range of substantially 180° of the upper half of the conveyance drum 12).

The first sheet 2a is wound on the outer circumferential surface 12s of the conveyance drum 12 through a first guide roll 14, and is conveyed along the outer circumferential surface 12s of the conveyance drum 12.

The duct 22 has an opening 24 facing the outer circumferential surface 12s of the conveyance drum 12 at one end thereof, a crusher 20 is connected to the other end thereof, and pulp (not shown) crushed by the crusher 20 is conveyed to the opening 24 through the duct 22. After discharged from the opening 24, the crushed pulp is sucked in a predetermined pattern on the first sheet 2a being conveyed along the outer circumferential surface 12s of the conveyance drum 12, thereby forming a fiber-laminated pulp layer 2b (see FIG. 2). The first sheet 2a and the pulp layer 2b are a substrate 2, and are conveyed integrally. The first sheet 2a is a support sheet 2a that supports the pulp layer 2b.

The spray apparatus 30 has a spray port 32 (see FIG. 2) facing the outer circumferential surface 12s of the conveyance drum 12, and discharges, from the spray port 32, the granular absorbing substance 8 (see FIG. 2) capable of absorbing and holding liquid. The absorbing substance 8 is, for example, powdery or granular SAP (Superabsorbent polymer). The granular absorbing substance 8 discharged from the spray port 32 is sprayed to the pulp layer 2b. The spray apparatus 30 may be structured as appropriate; for example, it may be structured so as to discharge a mixture of two or more kinds of absorbing substances.

A second sheet 4 is overlaid on the pulp layer 2b to which the granular absorbing substance 8 has been sprayed, through a second guide roll 16 and a compression roll 17, thereby forming the absorbent body 6 where the pulp layer 2b to which the absorbing substance 8 has been sprayed is sandwiched between the first sheet 2a and the second sheet 4. The absorbent body 6 is compressed in the thickness direction when passing between the conveyance drum 12 and the compression roll 17, and then, conveyed to the post-process through a third guide roll 18.

Figure 3:
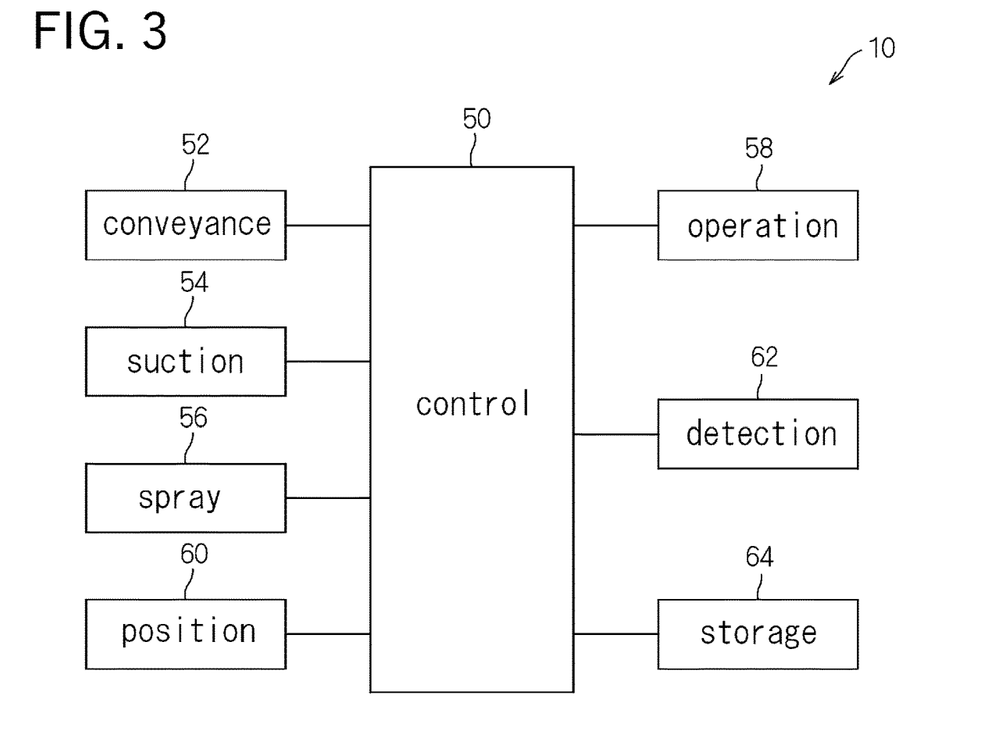
FIG. 3 is a block diagram of the absorbent body production device (first embodiment).

FIG. 3 is a block diagram of the absorbent body production device 10. As shown in FIG. 3, in the absorbent body production device 10, the following are connected to a control device 50 that supervises the control of the overall absorbent body production device 10: a conveyance motor 52 that rotates the conveyance drum 12; a suction motor 54; a spray motor 56 that drives the spray apparatus 30; and an operation device 58 for operating the absorbent body production device 10. Further, a spray position change device 60, a detection device 62 and a storage device 64 described later are connected to the control device 50. The control device 50 is, for example, a control computer such as a sequencer.

As shown in FIG. 1, the spray position of the granular absorbing substance 8 can be defined by an angle θ. The angle θ is an angle formed by a horizontal plane H and a straight line L vertical to the rotation center line $12x$ of the conveyance drum 12 and passing a point P within the spray position. The spray position of the absorbing substance 8, that is, the angle θ is preferably within a predetermined range satisfying $0° \leq θ \leq 60°$, and is most preferably θ=45°.

The absorbent body production device 10 which is provided with spray position control means for controlling the spray position of the absorbing substance 8 is capable of controlling the spray position of the granular absorbing substance 8 according to the production condition of the absorbent body 6.

For example, the spray position control means controls the position of the spray port 32 of the spray apparatus 30 or the discharge angle at which the absorbing substance 8 is discharged from the spray port 32 of the spray apparatus 30. In this case, the spray position control means includes (a) the spray position change device 60 (see FIG. 3) that changes the spray position of the granular absorbing substance 8, (b) the detection device 62 (see FIG. 3) that detects the spray position or the spray condition of the absorbing substance 8 and (c) the control device 50.

The spray position change device 60 changes the position of the spray port 32 of the spray apparatus 30 with respect to the outer circumferential surface $12s$ of the conveyance drum 12 or the discharge angle at which the absorbing substance 8 is discharged from the spray port 32 of the spray apparatus 30 to the outer circumferential surface $12s$ of the conveyance drum 12. In a case where the position of the spray port 32 of the spray apparatus 30 is changed, the spray position change device 60 may move at least the spray port 32 of the spray apparatus 30 in the vertical direction Z and/or the horizontal direction Y shown in FIG. 1, may move it in a diagonal direction intersecting the vertical direction Z and the horizontal direction Y, or may move it arcuately around the conveyance drum 12.

The detection device 62 is, for example, a camera that images the spray position of the absorbing substance 8 and its surroundings, or a sensor that detects the range where the absorbing substance 8 is sprayed (for example, the above-mentioned angle θ of the spray position of the absorbing substance 8) by sensor light passing near the spray position of the absorbing substance 8.

The control device 50 controls the spray position change device 60 in a manner that the angle θ of the spray position of the absorbing substance 8 is within the predetermined range satisfying $0° \leq θ \leq 60°$ while monitoring the spray position or the spray condition of the absorbing substance 8 detected by the detection device 62.

For example, the control device 50 controls the spray position change device 60 in a manner that the angle θ of the spray position of the absorbing substance 8 is not more than 45° when the rotation speed of the conveyance drum 12 is $V_1$.

When the rotation speed of the conveyance drum 12 is changed to $V_2$ ($V_2 > V_1$) in a manner that the angle θ of the spray position of the absorbing substance 8 is decreased to not more than 30°, the control device 50 controls the spray position change device 60 in a manner that the angle θ of the spray position of the absorbing substance 8 is not more than 45°.

By thus controlling the spray position of the absorbing substance 8 by the spray position control means, scattering of the absorbing substance 8 during spraying of the absorbing substance 8 to the substrate 2 can be suppressed, so that the spraying condition of the absorbing substance 8 is stabilized.

The spray position control means may automatically control the spray position of the absorbing substance 8 according to the production condition of the absorbent body 6.

In this case, the spray position control means includes, for example, the storage device 64 (see FIG. 3) prestoring optimum spray positions of the absorbing substance 8, that is, spray position information in association with production conditions of the absorbent body 6. Examples of the production conditions of the absorbent body 6 include the rotation speed of the conveyance drum 12, the kind, spray amount and spray pattern of the absorbing substance 8 to be sprayed and the kind (for example, fluff where crushed pulp or the like is fiber-laminated or a nonwoven fabric sheet processed so as to be bulky) and characteristics (for example, the thickness and the density) of the substrate to which the absorbing substance 8 is to be sprayed.

When the operation device 58 accepts an input of a production condition such as the rotation speed of the conveyance drum 12, the control device 50 of the spray position control means reads, from the storage device 64, the spray position information prestored in association with the production condition the input of which is accepted, and controls the spray position change device 60 in a manner that the absorbing substance 8 is sprayed to the optimum spray position indicated by the read spray position information while monitoring the spray position or the spray condition of the absorbing substance 8 detected by the detection device 62.

Automatically controlling the spray position of the absorbing substance 8 according to the production condition of the absorbent body 6 as described above makes it easy to change the production condition of the absorbent body 6.

The spray position control means may be capable of manually controlling the spray position by the operation device 58.

Next, an absorbent body production method of the first embodiment 1 using the absorbent body production device 10 will be described.

The absorbent body production method of the first embodiment is provided with (i) a conveyance step of conveying the substrate 2 along the rotating outer circumferential surface $12s$ of the conveyance drum 12 and (ii) a spray step of discharging the granular absorbing substance 8 from the spray port 32 facing the outer circumferential surface $12s$ of the conveyance drum 12 and spraying the absorbing substance 8 to the substrate 2 being conveyed along the outer circumferential surface $12s$ of the conveyance drum 12. At the spray step, the spray position at which the absorbing substance 8 is sprayed to the substrate 2 is controlled.

According to the above-described method, the spray position of the absorbing substance 8 can be controlled in a manner that scattering of the absorbing substance 8 is suppressed during spraying of the granular absorbing substance 8 to the substrate 2.

Specifically, the outer circumferential surface of the conveyance drum is air-permeable. The substrate 2 includes (a) the air-permeable first sheet $2a$ conveyed along the outer circumferential surface $12s$ of the conveyance drum 12 and (b) the pulp layer $2b$ where pulp crushed and conveyed by the duct 22 is sucked and fiber-laminated in a predetermined pattern on the first sheet $2a$. At the spray step, the absorbing substance 8 is sprayed to the pulp layer $2b$.

<Second embodiment> An absorbent body production device 10a and an absorbent body production method of the second embodiment using a nonwoven fabric as the substrate will be described with reference to FIG. 4. In the following, components the same as those of the first embodiment are denoted by the same reference numerals, and differences from the first embodiment will be described mainly.

Figure 4:
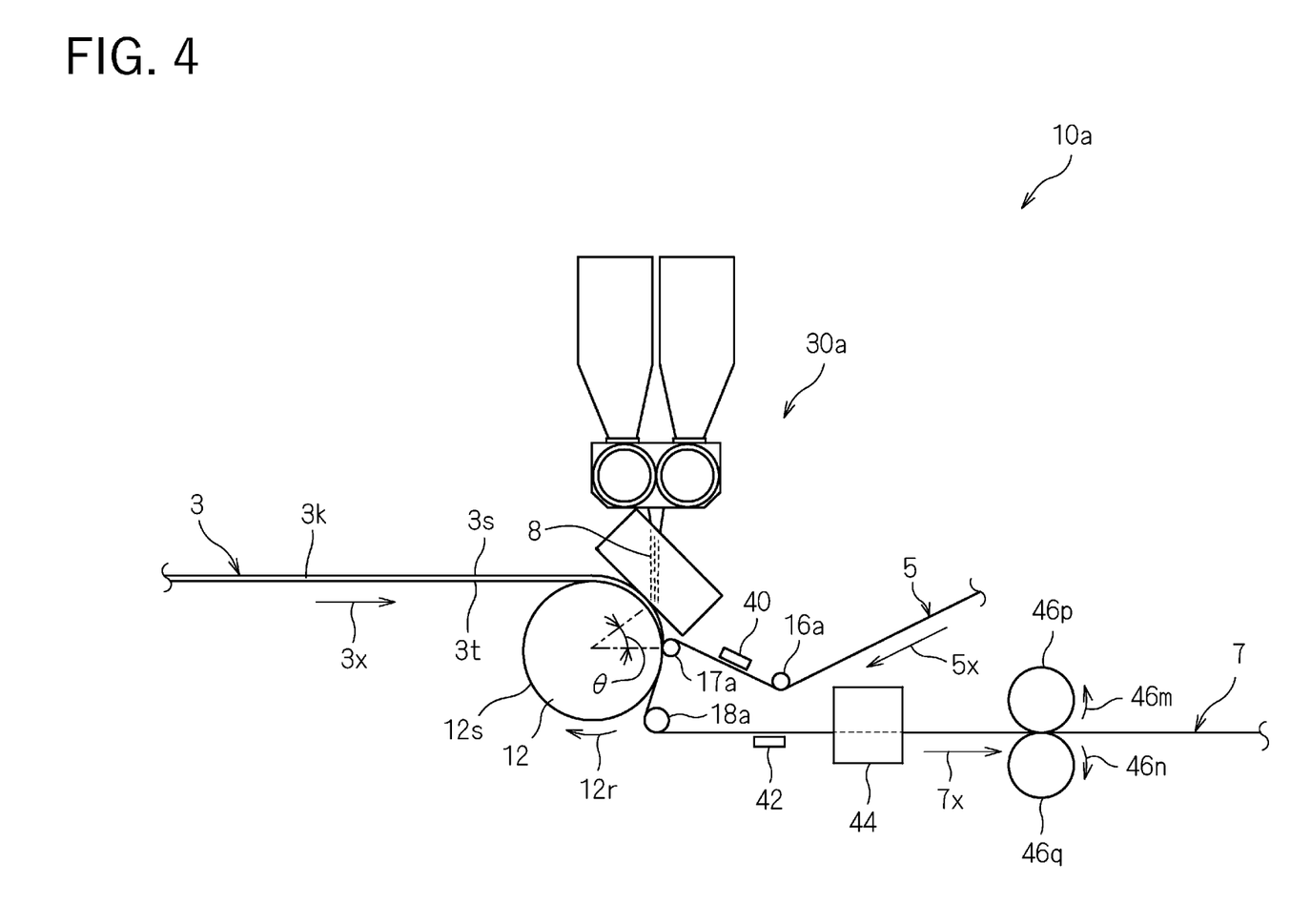
FIG. 4 is a schematic view of an absorbent body production device (second embodiment).

As shown in FIG. 4, in the absorbent body production device 10a of the second embodiment, as in the first embodiment, a spray apparatus 31 is disposed around the conveyance drum 12.

Unlike the first embodiment, a nonwoven fabric sheet 3 is conveyed along the outer circumferential surface 12s of the conveyance drum 12, and the granular absorbing substance 8 is sprayed to one main surface 3s of the nonwoven fabric sheet 3. The other main surface 3t of the nonwoven fabric sheet 3 is supported by the outer circumferential surface 12s of the conveyance drum 12.

The nonwoven fabric sheet 3 previously includes a bulky structure 3k constituting at least part of the one main surface 3s and having a gap for the granular absorbing substance 8 to enter. For example, the nonwoven fabric sheet 3 is napped along the one main surface 3s by a non-illustrated napping device, thereby forming the bulky structure 3k. While an appropriate kind of nonwoven fabric sheet is used as the nonwoven fabric sheet 3, for example, an air-through nonwoven fabric is used. The nonwoven fabric sheet 3 may be a composite sheet where two or more nonwoven fabric sheets are pasted together.

As in the first embodiment, the spray apparatus 31 discharges the granular absorbing substance 8 from a non-illustrated spray port facing the outer circumferential surface 12s of the conveyance drum 12. While spray apparatus 31 may be structured as appropriate, for example, it may be structured so as to discharge a mixture of two or more kinds of absorbing substances. The discharged absorbing substance 8 is sprayed to the one main surface 3s of the nonwoven fabric sheet 3 being conveyed by the conveyance drum 12. At least some of the sprayed absorbing substance 8 enters the bulky structure 3k of the nonwoven fabric sheet 3 from the one main surface 3s of the nonwoven fabric sheet 3.

Although the sprayed absorbing substance 8 enters the bulky structure 3k of the nonwoven fabric sheet 3 even if the structure is not employed where air is sucked from the outside toward the inside through the outer circumferential surface 12s of the conveyance drum 12, a structure where the outer circumferential surface 12s of the conveyance drum 12 is air-permeable and air is sucked from the outside toward the inside through the outer circumferential surface 12s of the conveyance drum 12 is preferable because the sprayed absorbing substance 8 readily enters the bulky structure 3k of the nonwoven fabric sheet 3.

A coating sheet 5 is overlaid on the nonwoven fabric sheet 3 to which the absorbing substance 8 has been sprayed, through a first guide roll 16a and a compression roll 17a. An adhesive is previously applied to the main surface of the coating sheet 5 facing the nonwoven fabric sheet 3 by a first adhesive application device 40 disposed on the upstream side of the compression roll 17a in the conveyance direction. The nonwoven fabric sheet 3 and the coating sheet 5 are compressed when passing between the conveyance drum 12 and the compression roll 17a, so that an absorbent body 7 is formed where the coating sheet 5 is bonded to the one main surface 3s of the nonwoven fabric sheet 3 to which the absorbing substance 8 has been sprayed.

For example, the width of the coating sheet 5 is larger than that of the nonwoven fabric sheet 3, and the coating sheet 5 is overlaid on the nonwoven fabric sheet 3 in such a manner that the coating sheet 5 protrudes on one side or on both sides in the width direction of the nonwoven fabric sheet 3. On the absorbent body 7, an adhesive is applied to the part of the coating sheet 5 protruding from the nonwoven fabric sheet 3 by a second adhesive application device 42. Then, the part of the coating sheet 5 protruding from the nonwoven fabric sheet 3 is folded so as to overlap the other main surface 3t of the nonwoven fabric sheet 3 by a folding device 44. Then, the absorbent body 7 is compressed in the thickness direction when passing between a pair of compression rolls 46p and 46q in the directions indicated by the arrows 46m and 46n.

The absorbent body 7 may be produced by overlaying the coating sheet 5 on the nonwoven fabric sheet 3 in a manner that the coating sheet 5 does not protrude in the width direction of the nonwoven fabric sheet 3.

Like the absorbent body production device 10 of the first embodiment, the absorbent body production device 10a of the second embodiment is provided with the spray position control means for controlling the spray position of the absorbing substance 8 and is capable of controlling the spray position of the absorbing substance 8. Consequently, scattering of the absorbing substance can be suppressed during spraying of the absorbing substance to the substance.

Next, an absorbent body production method of the second embodiment using the absorbent body production device 10a will be described.

The absorbent body production method of the second embodiment is provided with the conveyance step and the spray step the same as those of the absorbent body production method of the first embodiment, and at the spray step, the spray position at which the absorbing substance is sprayed to the substrate is controlled. However, unlike the absorbent body production method of the first embodiment, the substrate 3 includes the nonwoven fabric sheet 3 conveyed along the outer circumferential surface 12s of the conveyance drum 12. At the spray step, the absorbing substance 8 is sprayed to the one main surface 3s of the nonwoven fabric sheet 3. At the conveyance step, the nonwoven fabric sheet 3 includes the bulky structure 3k constituting at least part of the one main surface 3s and having a gap for the absorbing substance 8 to enter.

Figure 5:
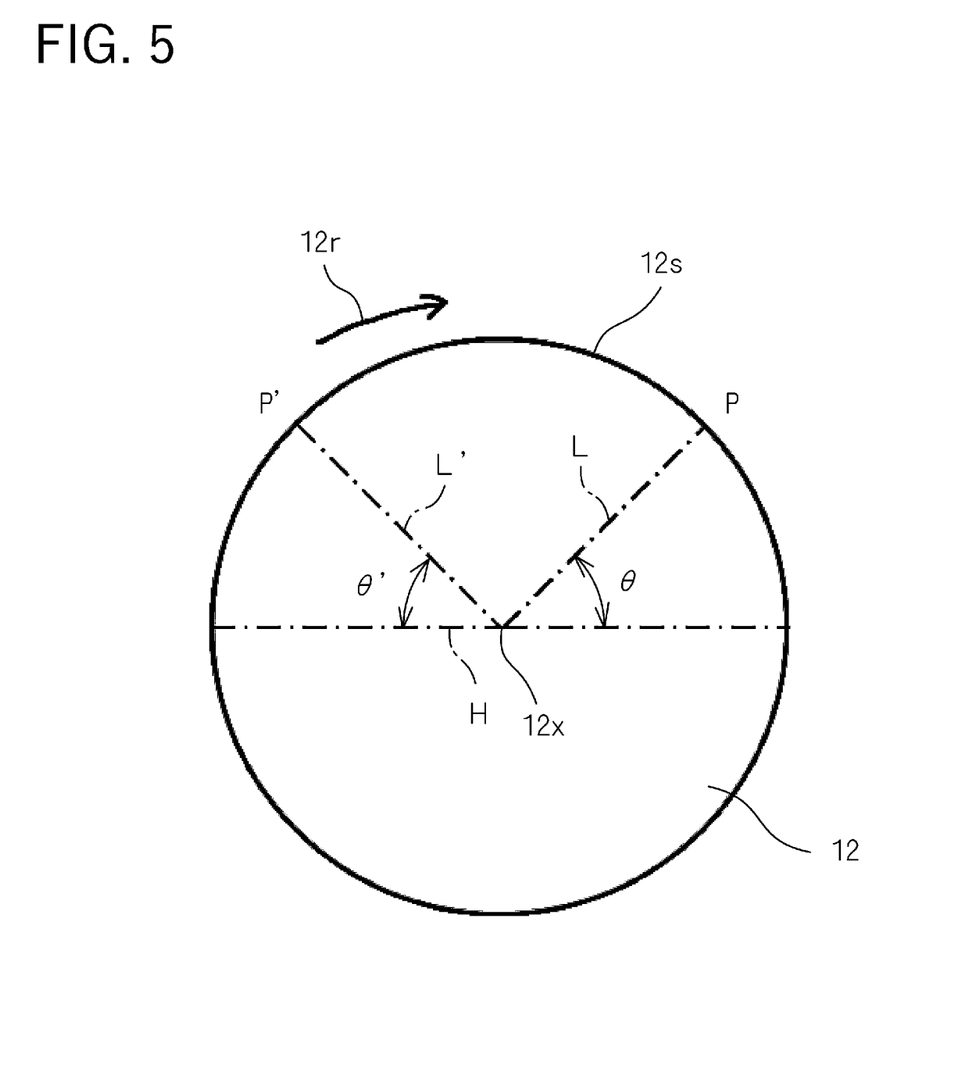
FIG. 5 is an explanatory view of a spray position (first modification).

<First modification> FIG. 5 is an explanatory view of the spray position. While in the first and second embodiments, a case is shown where, as shown in FIG. 5, the absorbing substance is sprayed to an area where the outer circumferential surface 12s of the conveyance drum 12 rotating in the direction indicated by the arrow 12r moves downward (for example, within a predetermined range satisfying $0° \leq \theta \leq 60°$ where $\theta$ is an angle formed by the horizontal plane H and the straight line L vertical to the rotation center line 12x of the conveyance drum 12 and passing the point P within the spray position), the absorbing substance may be sprayed to an area where the outer circumferential surface 12s of the conveyance drum 12 moves upward.

In the case where the absorbing substance is sprayed to the area where the outer circumferential surface 12s of the conveyance drum 12 moves upward, as in the first and second embodiments, the spray position of the granular absorbing substance can be defined by an angle $\theta'$. The angle $\theta'$ is an angle formed by the horizontal plane H and a straight line L' vertical to the rotation center line 12x of the conveyance drum 12 and passing a point P' within the spray position. The spray position of the absorbing substance, that is, the angle θ' is preferably within a predetermined range satisfying 0°≤θ'≤60°, and is most preferably θ'=45°.

<Summary> As described above, scattering of the absorbing substance 8 can be suppressed during spraying of the absorbing substance 8 to the substrate 2 or 3 by controlling the spray position of the absorbing substance 8.

The present invention is not limited to the above-described embodiments and may be variously modified when carried out.

For example, the absorbing substance 8 may be sprayed intermittently. In this case, by cutting the absorbent body 6 or 7 in an area where no absorbing substance 8 is sprayed, individual pieces of the absorbent body 6 or 7 with no spill of the absorbing substance 8 can be formed.

Moreover, an absorbent body 6 may be produced in which one side or both sides in the width direction of the first sheet 2a and/or the second sheet 4 of the first embodiment are folded.

DESCRIPTION OF REFERENCE NUMERALS

2 Substrate
2a First sheet (support sheet)
2b Pulp layer
3 Nonwoven fabric sheet (substrate)
3k Bulky structure
3s One main surface
5 Coating sheet
6, 7 Absorbent body
8 Absorbing substance
10, 10a Absorbent body production device
12 Conveyance drum
12s Outer circumferential surface
12x Rotation center line
22 Duct
24 Opening
30, 31 Spray apparatus
32 Spray port
50 Control device (spray position control means)
58 Operation device (spray position control means)
60 Spray position change device (spray position control means)
62 Detection device (spray position control means)
64 Storage device (spray position control means)

The invention claimed is:

1. An absorbent body production device comprising:
a conveyance drum having a rotating cylindrical outer circumferential surface and conveying a substrate along the outer circumferential surface;
a spray apparatus having a spray port facing the outer circumferential surface of the conveyance drum, discharging a granular absorbing substance from the spray port and spraying the absorbing substance to the substrate being conveyed along the outer circumferential surface of the conveyance drum;
a spray position change device configured to change a position of the spray port with respect to the outer circumferential surface;
a detection device configured to detect a spray position of the absorbing substance; and
spray position control means for controlling the spray position at which the absorbing substance is sprayed to the substrate by controlling the spray position change device.

2. The absorbent body production device according to claim 1, wherein the spray position control means controls the spray position in a manner that, when an angle formed by a horizontal plane and a straight line vertical to a rotation center line of the conveyance drum and passing the spray position is θ, the angle θ is within a predetermined range satisfying 0°≤θ≤60°.

3. The absorbent body production device according to claim 2, wherein the spray position control means controls the spray position in a manner that θ=45° is included within the predetermined range of the angle θ.

4. The absorbent body production device according to claim 1, wherein the spray position control means controls the position of the spray port of the spray apparatus or a discharge angle at which the absorbing substance is discharged from the spray port of the spray apparatus.

5. An absorbent body production method comprising:
a conveyance step of conveying a substrate along a rotating outer circumferential surface of a conveyance drum; and
a spray step of discharging a granular absorbing substance from a spray port facing the outer circumferential surface of the conveyance drum and spraying the absorbing substance to the substrate being conveyed along the outer circumferential surface of the conveyance drum,
wherein at the spray step, a spray position at which the absorbing substance is sprayed to the substrate is controlled while monitoring the spray position by using a detection device.

6. The absorbent body production method according to claim 5,
wherein the outer circumferential surface of the conveyance drum is air-permeable,
the substrate includes:
an air-permeable support sheet conveyed along the outer circumferential surface of the conveyance drum; and
a pulp layer where pulp crushed and conveyed by a duct is sucked and fiber-laminated in a predetermined pattern on the support sheet, and
at the spray step, the absorbing substance is sprayed to the pulp layer.

7. The absorbent body production method according to claim 5,
wherein the substrate includes a nonwoven fiber sheet conveyed along the outer circumferential surface of the conveyance drum,
at the spray step, the absorbing substance is sprayed to one main surface of the nonwoven fabric sheet, and
at the conveyance step, the nonwoven fabric sheet includes a bulky structure constituting at least part of the one main surface and having a gap for the absorbing substance to enter.

* * * * *